(12) United States Patent
Ehrlich

(10) Patent No.: US 10,431,257 B1
(45) Date of Patent: Oct. 1, 2019

(54) DATA CENTER DUAL STAGE DRIVE WITH DATA STRIPING

(71) Applicant: KABUSHIKI KAISHA TOSHIBA, Tokyo (JP)

(72) Inventor: Richard M. Ehrlich, Saratoga, CA (US)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 16/174,221

(22) Filed: Oct. 29, 2018

Related U.S. Application Data

(60) Provisional application No. 62/696,288, filed on Jul. 10, 2018.

(51) Int. Cl.
*G11B 5/54* (2006.01)
*G11B 21/08* (2006.01)
*G11B 5/012* (2006.01)
*G11B 5/596* (2006.01)

(52) U.S. Cl.
CPC ............ *G11B 21/083* (2013.01); *G11B 5/012* (2013.01)

(58) Field of Classification Search
CPC . G11B 5/556; G11B 2220/2516; G11B 15/43; G11B 15/48; G11B 5/5552; G11B 5/596; G11B 5/5547; G11B 5/59633
USPC .......................... 360/75, 78.05, 78.09, 78.12
See application file for complete search history.

(56) References Cited

U.S. PATENT DOCUMENTS 8,542,458 B2 * 9/2013 Matsunaga .......... G11B 5/4873
360/77.02

* cited by examiner

*Primary Examiner* — Nabil Z Hindi
(74) *Attorney, Agent, or Firm* — Kim & Stewart LLP

(57) ABSTRACT

A dual-stage servo system of a disk drive includes a first fine positioning servo system with a first microactuator that independently controls the position of a first read/write head over a first recording surface and a second fine positioning servo system with a second microactuator that independently controls the position of a second read/write head over a second recording surface. The first microactuator accesses a first data stripe while the second fine positioning servo system simultaneously accesses a second data stripe. Data can be transferred to or from the first and second data stripes simultaneously.

20 Claims, 9 Drawing Sheets

DATA CENTER DUAL STAGE DRIVE WITH DATA STRIPING

CROSS-REFERENCE TO RELATED APPLICATIONS

This application claims the benefit of priority to Provisional U.S. Patent Application 62/696,288, filed Jul. 10, 2018, the entire contents of which are incorporated herein by reference.

BACKGROUND

The development of cloud computing and file hosting services has enabled individuals, businesses, and government organizations to easily upload data to and download data from remote storage facilities via the Internet, such as data centers. Magnetic hard disk drives (HDDs) have been employed in data centers as a low-cost means for providing random access to large quantities of data. Because low-latency is an important performance metric in cloud computing, it is desirable for the HDDs employed in data centers to have high data transfer rates.

One approach for achieving high data transfer rate in an HDD is the use of multiple actuators, where each actuator independently controls the position of a different set of one or more read/write heads. Because the position of multiple read/write heads can be controlled simultaneously, data can be read from or written to multiple recording surfaces in the drive, and therefore data can be transferred at a higher rate than in a single actuator HDD. However, due to the added complexity and larger number of moving parts associated with multiple actuator HDDs, such drives are more expensive to manufacture and more prone to failure.

SUMMARY

One or more embodiments provide systems and methods for increasing sequential read/write performance in a drive via data striping. Specifically, a dual-stage servo system of a disk drive includes a first fine positioning servo system with a first microactuator that independently controls the position of a first read/write head over a first recording surface and a second fine positioning servo system with a second microactuator that independently controls the position of a second read/write head over a second recording surface. In operation, the first microactuator accesses (reads data from or writes data to) a first data stripe while the second fine positioning servo system simultaneously accesses a second data stripe. As a result, data can be transferred to or from the data stripes at twice the normal data transfer rate compared to the data transfer rate associated with accessing a single surface of the HDD with a single read/write head.

A disk drive, according to an embodiment, includes a first magnetic head and a second magnetic head; a voice-coil motor configured for coarse positioning of the first magnetic head and the second magnetic head; a first microactuator coupled to the voice-coil motor and the first magnetic head; a second microactuator coupled to the voice-coil motor and the second magnetic head; and a controller. The controller is configured to receive from a host device a write command that includes a set of data that has a first data block and a second data block; select a first storage block disposed on a first disk surface for storing the first data block and a second storage block disposed on a second disk surface for storing the second data block; position the first magnetic head over the first storage block with the voice-coil motor, the first microactuator, and a first servo controller and writing the first data block to the first storage block; and positioning the second magnetic head over the second storage block with the voice-coil motor, the second microactuator, and a second servo controller and writing the second data block to the second storage block.

A disk drive, according to another embodiment, includes a first magnetic head and a second magnetic head; a first microactuator coupled to a voice-coil motor and the first magnetic head; a second microactuator coupled to the voice-coil motor and the second magnetic head; a voice-coil motor configured for coarse positioning of the first magnetic head and the second magnetic head; and a controller. The controller is configured to receive from a host device a read command that includes a set of data that has a first data block and a second data block; select a first storage block disposed on a first disk surface from which to read the first data block and a second storage block disposed on a second disk surface from which to read the second data block; position the first magnetic head over the first storage block with the voice-coil motor, the first microactuator, and a first servo controller and reading the first data block from the first storage block; and position the second magnetic head over the second storage block with the voice-coil motor, the second microactuator, and a second servo controller and read the second data block to the second storage block.

A disk drive, according to another embodiment, includes a first magnetic head and a second magnetic head; a first microactuator coupled to a voice-coil motor and the first magnetic head; a second microactuator coupled to the voice-coil motor and the second magnetic head; a voice-coil motor configured for coarse positioning of the first magnetic head and the second magnetic head; and a first recording surface that includes a first storage block and a second recording surface that includes a first storage block, wherein the first storage block is logically adjacent to the second storage block and physically separated from the second storage block.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
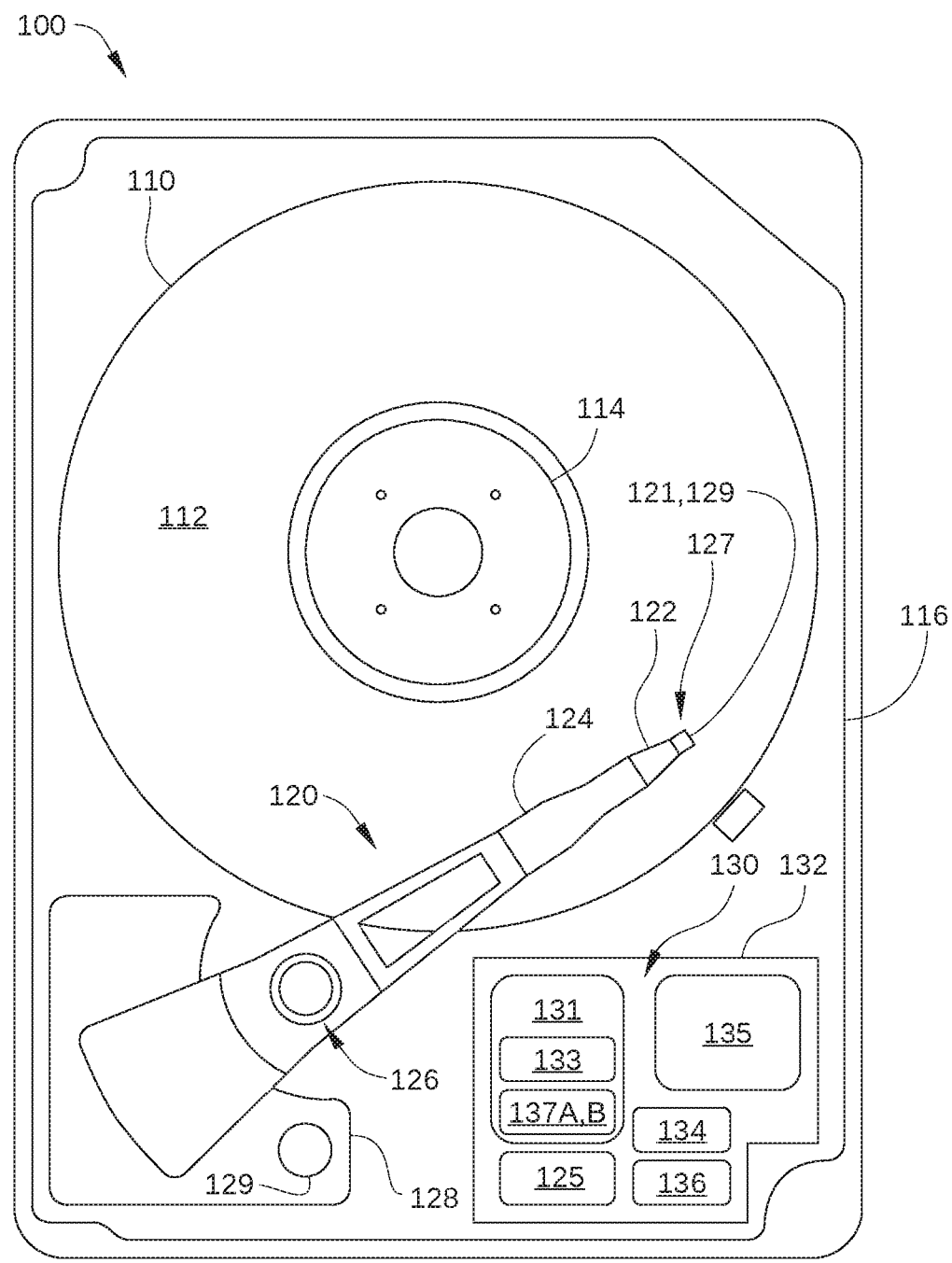
FIG. 1 is a schematic view of an exemplary hard disk drive, according to one embodiment.

FIG. 1 is a schematic view of an exemplary hard disk drive (HDD) 100, according to one embodiment. For clarity, HDD 100 is illustrated without a top cover. HDD 100 includes multiple storage disks 110 (only one of which is visible in FIG. 1) that each include one or two recording surfaces 112 on which a plurality of concentric data storage tracks are disposed. Storage disks 110 are coupled to and rotated by a spindle motor 114 that is mounted on a base plate 116. An actuator arm assembly 120 is also mounted on base plate 116, and includes multiple sliders 121 (only one of which is visible in FIG. 1), each mounted on a flexure arm (also referred to as a suspension) 122 with a magnetic read/write head 127 that reads data from and writes data to the data storage tracks of an associated recording surface 112. Each flexure arm 122 is attached to an actuator arm 124 that rotates about a bearing assembly 126. Voice coil motor 128 moves all of the multiple sliders 121 radially relative to a recording surface 112 of a storage disk 110, thereby providing coarse radial positioning of the read/write heads 127 over a desired concentric data storage track. Spindle motor 114, read/write heads 127, and voice coil motor 128 are coupled to electronic circuits 130, which are mounted on a printed circuit board 132.

Fine radial positioning of each read/write head 127 is accomplished with a respective microactuator 129. The microactuator 129 for each read/write head 127 is mechanically coupled to the actuator arm 124 that corresponds to the read/write head 127. Each microactuator 129 typically includes one or more piezoelectric elements and is configured to move a corresponding read/write head 127 radially a small distance, for example on the order of a few tens or hundreds of nanometers. When employed together, microactuators 129 and voice coil motor 128 are sometimes referred to as dual-stage actuators, where voice coil motor 128 is the prime mover and each microactuator 129 is a second-stage actuator. Dual-stage actuators enable the servo system of HDD 100 to attain more accurate tracking control.

In some embodiments, each microactuator 129 is mounted on a respective flexure arm 122, at a gimbal between the respective flexure arm 122 and the corresponding slider 121. In such embodiments, each microactuator 129 rotates the corresponding slider 121, causing radial motion (relative to recording surface 112) of the corresponding read/write head 127. Alternatively or additionally, in some embodiments, each microactuator 129 is mounted on a flexure arm 122 near where the flexure arm 122 is mounted to an actuator arm 124, and moves the flexure arm 122 through a relatively large arc, for example on the order of a hundred track widths. In yet other embodiments, each microactuator 129 includes a first piezoelectric or other movable element at the gimbal between the respective flexure arm 122 and the corresponding slider 121 and a second piezoelectric or other movable element at the end of the actuator arm 124. In such embodiments, each read/write head 127 is provided with three-stage actuation in the radial direction. One embodiment of dual-stage actuators implemented in HDD 100 is illustrated in FIG. 2.

Figure 2:
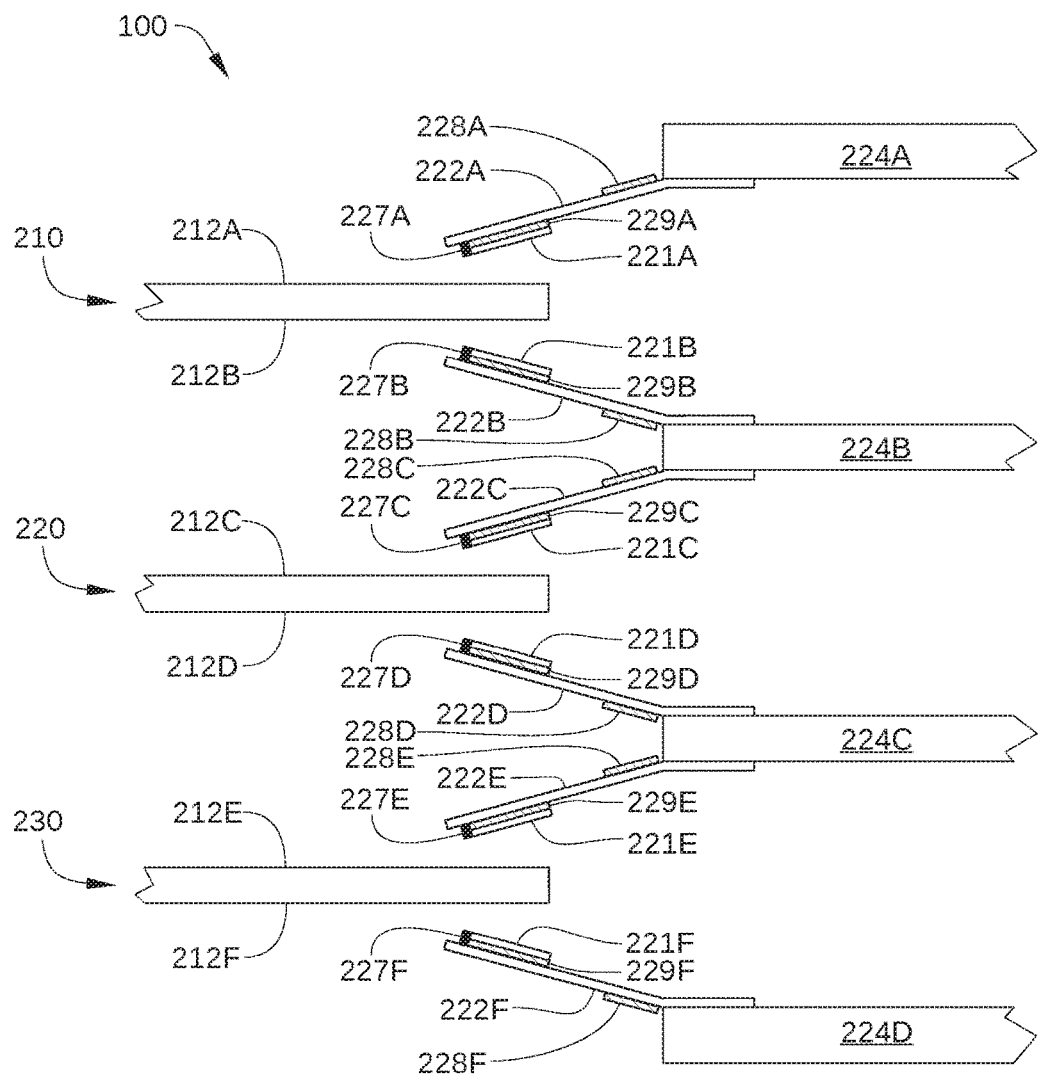
FIG. 2 schematically illustrates a partial side-view of the multiple storage disks and multiple dual-stage actuators of a hard disk drive, according to an embodiment.

FIG. 2 schematically illustrates a partial side-view of multiple storage disks 210, 220, and 230 (referred to collectively herein as storage disks 110) and multiple dual-stage actuators of HDD 100, according to an embodiment. As shown, HDD 100 is configured with multiple storage disks 110, each having two recording surfaces, and multiple read/write heads 227A-227F that each correspond to a respective recording surface. Specifically, in the embodiment illustrated in FIG. 2, HDD 100 includes a storage disk 210 with recording surfaces 212A and 212B, a storage disk 220 with recording surfaces 212C and 212D, and a storage disk 230 with recording surfaces 212E and 212F. HDD 100 further includes read/write heads 227A-227F (referred to collectively herein as read/write heads 127) that each correspond to one of recording surfaces 212A-212F. Thus, read/write head 227A reads data from and writes data to corresponding recording surface 212A, read/write head 227B reads data from and writes data to corresponding recording surface 212B, and so on.

Read/write heads 227A-227F are disposed on sliders 221A-221F, respectively, and sliders 221A-221F are coupled to flexure arms 222A-222F, respectively. In some embodiments, each of sliders 221A-221F (referred to collectively herein as sliders 221) is mounted on a corresponding one of flexure arms 222A-222F (referred to collectively herein as flexure arms 222) via a microactuator 229A-F (referred to collectively herein as microactuators 229). For example, a microactuator 229 can include a microactuator (MA) second stage that includes two lead zirconate titanate piezoelectric actuators attached to a baseplate of the corresponding flexure arm 222. Alternatively, in some embodiments, each of sliders 221A-221F is mounted directly on a corresponding one of flexure arms 222A-222F.

As shown, flexure arm 222A is coupled to an actuator arm 224A, flexure arms 222B and 222C are coupled to an actuator arm 224B, flexure arms 222D and 222E are coupled to an actuator arm 224C, and flexure arm 222F is coupled to an actuator arm 224D. Actuator arms 224A-224D are referred to collectively herein as actuator arms 124. In the embodiment illustrated in FIG. 2, each of microactuators 228A-228F (referred to collectively herein as microactuators 228) is disposed near a base of a respective flexure arm 222A-222F, i.e., proximate one of actuator arms 124. For example, microactuators 228 can each include a pair of piezoelectric strips that are mounted on the corresponding flexure arm 222 near to where that flexure arm 222 is attached to the corresponding actuator arm 124. When one such piezoelectric strip expands and the other piezoelectric strip contracts, the flexure arm 222 sways to one side, moving a corresponding slider 221 radially. Because the diameter of the circular arc along which the slider 221 moves is approximately equal to the length of the flexure arm 222 (which is generally larger than the length of the slider 221), microactuators 228 can provide significantly greater range of radial motion of a read/write head 127 than microactuators 229A-229F. The above-described configuration of microactuators 228 is merely an example, and any other technically feasible configuration of microactuators 228 can be included in the dual-stage actuators implemented in HDD 100.

Alternatively or additionally, in some embodiments, microactuators 229A-229F can also be disposed proximate sliders 221A-221F, respectively, i.e., near a tip of flexure arms 222A-222F, respectively. In embodiments in which microactuators 229 are disposed proximate sliders 221, each of microactuators 229 can include a gimbal microactuator that enables sliders 121 to compensate for perturbations in the radial direction by yawing accordingly. The above-described configuration of microactuators 229 is merely an example, and any other technically feasible configuration of microactuators 229 can be included in the dual-stage actuators implemented in HDD 100. Each of microactuators 229 and/or 228 compensates for perturbations in the radial position of sliders 121, so that read/write heads 127 follow the proper data track on recording surfaces 112. Thus, microactuators 229 can compensate for vibrations of the disk, inertial events such as impacts to HDD 100, and irregularities in recording surfaces 112.

According to various embodiments described herein, independently controlling the position of two or more of read/write heads 127 via microactuators 229 and/or 228 enables a significant increase in the data transfer rate of HDD 100. Specifically, a particular set of data is split (or "striped") between a first data stripe on one recording surface 112 of HDD 100 and a second data stripe on a different recording surface 112 of HDD 100. A first read/write head 127 can then be positioned to access (i.e., read data from or write data to) the first data stripe while a second read/write head 127 can be positioned to access the second data stripe. Thus, for a single disk access command referencing that particular set of data, the two read/write heads 127 can simultaneously access data storage locations for that set of data, effectively doubling the normal data transfer rate of HDD 100.

It is noted that the configuration of HDD 100 illustrated in FIG. 2 is merely an example. Other embodiments can include any other technically feasible configuration of HDD 100 with multiple recording surfaces, read/write heads, and associated microactuators.

Returning to FIG. 1, electronic circuits 130 includes read/write channels 137A and 137B, a microprocessor-based controller 133, random-access memory (RAM) 134 (which may be a dynamic RAM and is used as one or more data buffers) and/or a flash memory device 135, and in some embodiments a flash manager device 136. In some embodiments, read channel 137 and microprocessor-based controller 133 are included in a single chip, such as a system-on-chip (SoC) 131. HDD 100 further includes a motor-driver chip 125 that accepts commands from microprocessor-based controller 133 and drives spindle motor 114, voice coil motor 128, and microactuators 229. Read/write channel 137 communicates with read/write heads 127 via a preamplifier (not shown) that may be mounted on a flex-cable that is itself mounted on either base plate 116, one of actuator arms 124, or both. Electronic circuits 130 and motor-driver chip 125 are described below in greater detail in conjunction with FIG. 3.

Figure 3:
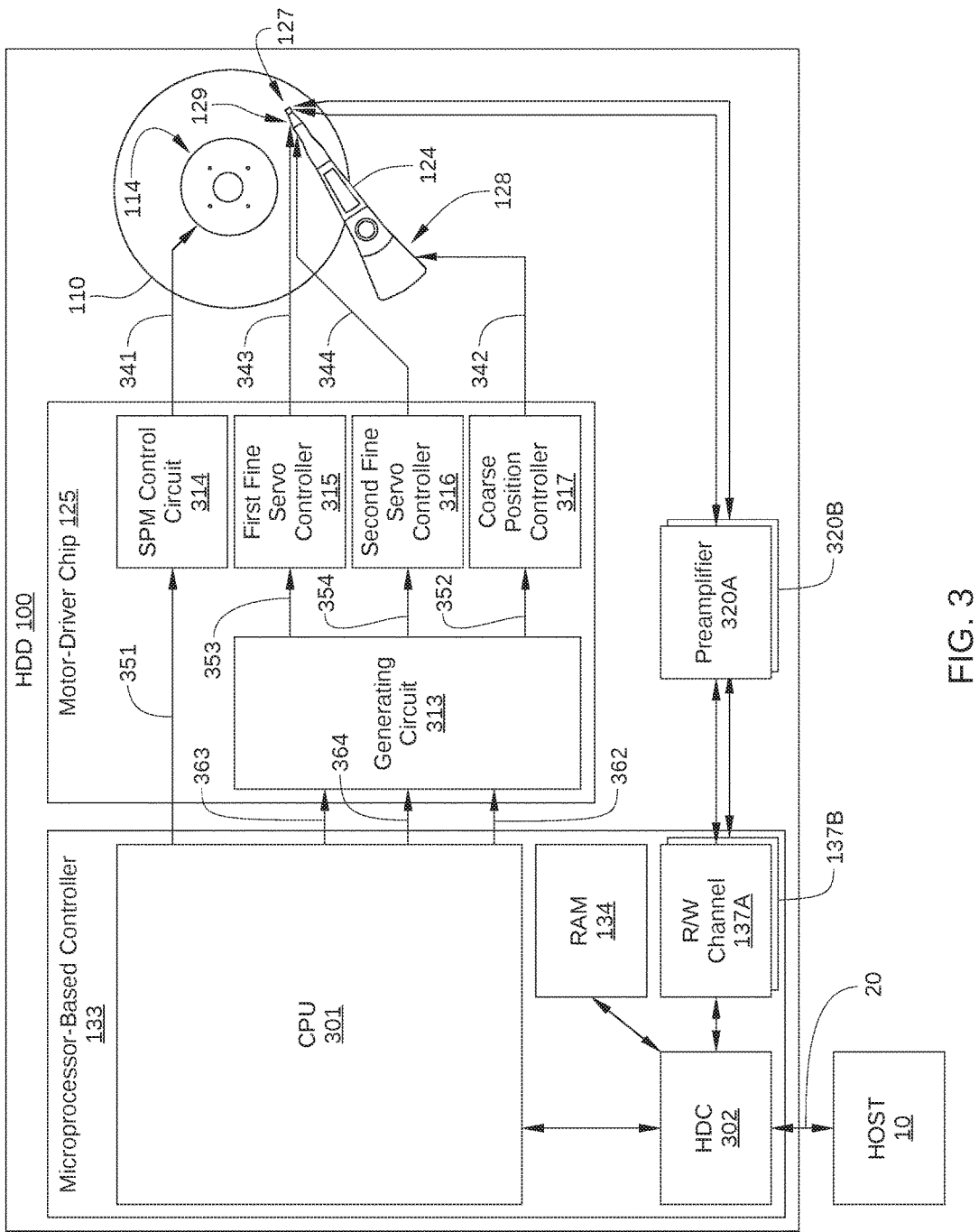
FIG. 3 illustrates an operational diagram of a hard disk drive, with elements of electronic circuits and a motor-driver chip shown configured according to one embodiment.

FIG. 3 illustrates an operational diagram of HDD 100, with elements of electronic circuits 130 and motor-driver chip 125 shown configured according to one embodiment. HDD 100 is connected to a host 10, such as a host computer, via a host interface 20, such as a serial advanced technology attachment (SATA) bus or SAS. As shown, microprocessor-based controller 133 includes one or more central processing units (CPU) 301 or other processors, a hard disk controller (HDC) 302, and read/write channels 137A and 137B (referred to collectively herein as read/write channels 137). Motor-driver chip 125 includes a generating circuit 313, a spindle motor (SPM) control circuit 314, a first fine servo controller 315, a second fine servo controller 316, and a coarse position controller 317. HDD 100 further includes preamplifiers (or head amplifiers) 320A and 320B that are each typically mounted on one of actuator arms 124. Preamplifier 320A supplies a write signal (e.g., current) to any one of a first group of read/write heads 127 (for example, a group that includes read/write heads 227A, 227C, and 227E in FIG. 2) in response to write data input from the read/write channel 137A. In addition, preamplifier 320A amplifies a read signal output from any one of the first group of read/write heads 127 and transmits the amplified read signal to read/write channel 137A. Similarly, preamplifier 320B supplies a write signal to any one of a second group of read/write heads 127 (for example, a group that includes read/write heads 227B, 227D, and 227F in FIG. 2) in response to write data input from the read/write channel 137B, and preamplifier 320B amplifies a read signal output from any one of the second group of read/write heads 127 and transmits the amplified read signal to read/write channel 137B.

CPU 301 controls HDD 100, for example according to firmware stored in flash memory device 135 or another nonvolatile memory, or read from a reserved area of one or more of the disks 110. For example, CPU 301 performs control functions for various processes, including a read process and a write process as described herein. CPU 301 performs such processes in conjunction with HDC 302, read/write channel 137, read/write heads 127, recording surfaces 112, and motor-driver chip 125. Read/write channels 137A and 137B are signal processing circuits that encode write data input from HDC 302 and output the encoded write data to preamplifier 320A or 320B. Read/write channels 137A and 137B also decode a read signal transmitted from preamplifier 320A or 320B into read data that are output to HDC 302. In the embodiment illustrated in FIG. 3, read/write channels 137A and 137B are each configured as a single read channel circuit and a single write channel circuit, whereas in other embodiments, read/write channels 137A and 137B can be integrated into a single circuit that is configured with the functionality of two separate read channels and two separate write channels.

HDC 302 receives/transmits data from/to host 10 host via interface 20. In some embodiments, the components of microprocessor-based controller 133 (e.g., CPU 301, HDC 302, and read/write channel 137) are implemented as a one-chip integrated circuit (i.e., as an SoC). Alternatively, one or more of CPU 301, HDC 302, and read/write channel 137 can each be implemented as a separate chip.

Motor-driver chip 125 drives the spindle motor 114, a coarse position actuator (that includes voice coil motor 128, bearing assembly 126, and actuator arms 124), and microactuators 129 in accordance with control signals from CPU 301. Specifically, SPM control circuit 314 generates a set of drive signals 341 (drive voltages or a drive currents) in response to a control signal 351 received from the CPU 301, and supplies drive signal 341 to spindle motor 114. In this way, spindle motor 114 rotates storage disks 110. In addition, coarse position servo controller 317 generates a drive signal 342 (drive voltage or drive current) in accordance with a received coarse position control signal 352, and supplies the coarse position control signal 342 to the coarse position actuator (voice coil motor 128). In this way, the coarse position actuator coarsely positions read/write heads 127 radially with respect to recording surfaces 112. Further, first fine servo controller 315 generates a drive signal 343 (drive voltage or drive current) in accordance with a received fine position control signal 353, and supplies drive signal 343 to a first fine position actuator (one of microactuators 129). In this way, the first fine position actuator performs fine positioning of a first read/write head 127 radially with respect to a first recording surface 112. Similarly, second fine servo controller 316 generates a drive signal 344 (drive voltage or drive current) in accordance with a received fine position control signal 354, and supplies drive signal 344 to a second fine position actuator (another of microactuators 129). In this way, the second fine position actuator performs fine positioning of a second read/write head 127 radially with respect to a second recording surface 112.

Generating circuit 313 generates coarse position control signal 352 in response to a control signal 362 from CPU 301, fine position control signal 353 in response to a control signal 363 from CPU 301, and fine position control signal 354 in response to a control signal 364 from CPU 301. Alternatively, in some embodiments, first fine servo controller 315, second fine servo controller 316, and coarse position controller 317 respectively receive fine position control signal 353, fine position control signal 354, and coarse position control signal 352 directly from CPU 301.

In the embodiment illustrated in FIG. 3, a first servo system, a second servo system, and a third servo system, described below, enable two of read/write heads 127 to access a respective recording surface 112 of HDD 100 simultaneously. Alternatively, in some embodiments, three or more of read/write heads 127 are configured to access a respective recording surface 112 of HDD 100 simultaneously.

The first servo system (e.g., CPU 301, read/write channel 137A or 137B, preamplifier 320A or 320B, coarse position control circuit 317, and voice-coil motor 128) performs coarse positioning of a read/write head 127 over a corresponding recording surface 112, during which CPU 301 determines an appropriate current to drive through the voice coil of voice coil motor 128. Typically, the appropriate current is determined based in part on a position feedback signal one or more of the of the read/write heads 127, i.e., a position error signal (PES).

The second servo system performs fine positioning of a read/write head 127 (e.g., read/write head 227A in FIG. 2) over a corresponding recording surface 112 (e.g., recording surface 212A in FIG. 2). The second servo system includes, for example, CPU 301, read/write channel 137A, preamplifier 320A, first fine servo controller 315, and one of microactuators 129 (e.g., microactuator 229A in FIG. 2). During the fine positioning of that particular read/write head 127, CPU 301 determines an appropriate voltage to drive through the microactuator 129 that corresponds to the read/write head 127. Typically, the appropriate current for voice coil motor 128 and the appropriate voltage for microactuator 129 are determined based in part on a PES of the corresponding read/write head 127.

The third servo system performs fine positioning of a different read/write head 127 (e.g., read/write head 227B in FIG. 2) over a corresponding recording surface 112 (e.g., recording surface 212B in FIG. 2). The third servo system includes, for example, CPU 301, read/write channel 137B, preamplifier 320B, second fine servo controller 316, and one of microactuators 129 (e.g., microactuator 229B in FIG. 2). During the fine positioning of that particular read/write head 127, CPU 301 determines an appropriate voltage to drive through the microactuator 129 that corresponds to the read/write head 127. Typically, the appropriate current for voice coil motor 128 and the appropriate voltage for microactuator 129 are determined based in part on a PES of the corresponding read/write head 127. Although FIG. 3 shows a single CPU 301, it is possible that multiple CPUs could be used (for example, one CPU to control the fine positioning of one head, and another CPU to control the fine positioning of another head).

According to embodiments of the disclosure, a logical volume of HDD 100 is striped between two (or more) recording surfaces 112. As a result, when a disk access command references a stripe on each of the two (or more) recording surfaces 112, HDD 100 can complete the disk access command much more quickly than a conventional disk drive. This is because the two (or more) read/write heads 127 are each configured to simultaneously access one of these recording surfaces 112, and therefore can each execute a portion of the disk access command simultaneously. For example, when a read command received by HDD 100 references data stored in a first stripe on a first recording surface 112 (e.g., recording surface 212A in FIG. 2) and data stored in a second stripe on a second recording surface 112 (e.g., recording surface 212B in FIG. 2), a first read/write head 127 (e.g., read/write head 227A in FIG. 2) can read the data stored in the first stripe and a second read/write head 127 (e.g., read/write head 227B in FIG. 2) can read the data stored in the second stripe. Consequently, HDD 100 can complete the disk access command approximately twice as quickly as a disk drive in which a single read/write head executes the disk access command. One embodiment of such data striping in HDD 100 is illustrated in FIG. 4.

Figure 4:
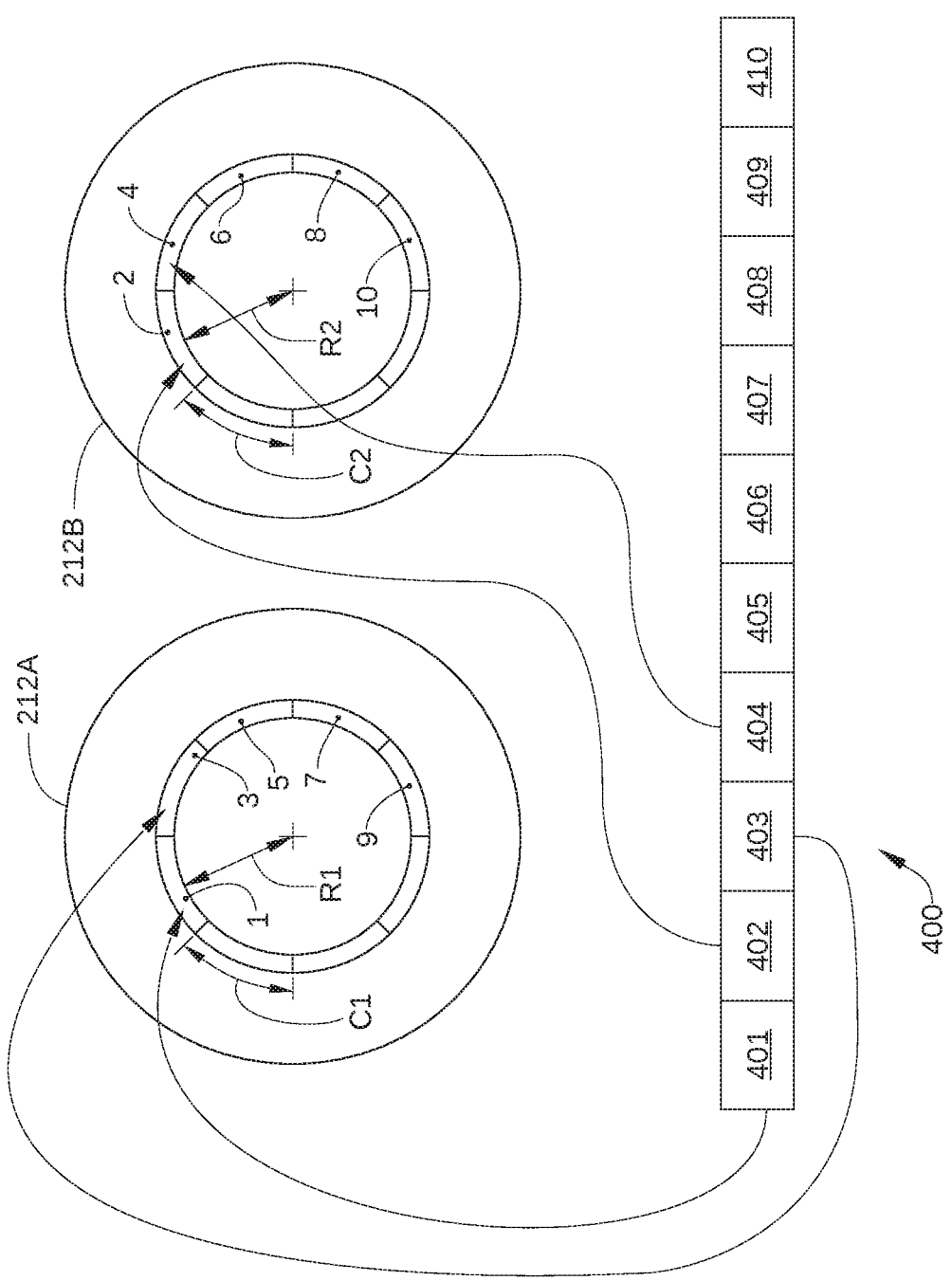
FIG. 4 schematically illustrates striping of data between multiple recording surfaces of the hard disk drive of FIG. 1, according to an embodiment.

FIG. 4 schematically illustrates striping of data between multiple recording surfaces 112 of HDD 100, according to an embodiment. In the embodiment illustrated in FIG. 4, data is striped between two recording surfaces 112 of HDD 100, specifically between recording surfaces 212A and 212B. It is noted that recording surfaces 212A and 212B are disposed on opposite sides of the same storage disk 110 of HDD 100, in this case storage disk 210 (shown in FIG. 2). Alternatively, in some embodiments data can be striped between two recording surfaces 112 that are not on the same storage disk 110, for example between recording surfaces 212A and 212C, between recording surfaces 212B and 212D, etc.

Recording surface 212A is accessed (i.e., written to and read from) by read/write head 227A (shown in FIG. 2), and includes a plurality of data storage regions, or "storage blocks," 1, 3, 5, 7, and 9, for storing data. Similarly, recording surface 212B is accessed by read/write head 227B (shown in FIG. 2), and includes a plurality of storage blocks 2, 4, 6, 8, and 10 for storing data. Together, storage blocks 1, 3, 5, 7, and 9 and storage blocks 2, 4, 6, 8, and 10 are associated with a single logical volume for storing a set of data 400 that includes data blocks 401-410. As shown, the storage locations for data blocks 401-410 are striped between recording surface 212A and recording surface 212B. Thus, data blocks 401-410 are alternately stored on recording surface 212A and recording surface 212B. To wit, data block 401 is stored in storage block 1 of recording surface 212A, data block 402 is stored in storage block 2 of recording surface 212B, data block 403 is stored in storage block 3 of recording surface 212A, data block 404 is stored in storage block 4 of recording surface 212B, and so on. Thus, two of storage blocks 1-10 may be logically adjacent, but physically separated. For example, storage blocks 1 and 2 are logically adjacent, but storage block 1 is disposed on recording surface 212A while storage block 2 is disposed on recording surface 212B.

Data blocks 401-410 can represent the data for a sequence of logical identification numbers employed by host 10, such as logical block addresses (LBAs). Alternatively, data blocks 401-410 can represent any other sequential set of data that a host requests HDD 100 to read or write, or that HDD 100 otherwise reads or writes during operation.

When a disk access command referencing data blocks 401-410 is received by HDD 100, read/write head 227A can execute the portion of the disk access command associated with data blocks 401, 403, 405, 407, and 409, while read/write head 227B can simultaneously execute the portion of the disk access command associated with data blocks 402, 404, 406, 408, and 410. For example, in one embodiment, while read/write head 227A writes data block 401 to storage block 1 (or reads data block 401 from storage block 1), read/write head 227B writes data block 402 to storage block 2 (or reads data block 402 from storage block 2). Then, while read/write head 227A writes data block 403 to storage block 3 (or reads data block 403 from storage block 3), read/write head 227B writes data block 404 to storage block 4 (or reads data block 404 from storage block 4). This process continues until all of data blocks 401-410 are read or written. Because the disk access command referencing data blocks 401-410 is simultaneously executed via two read/write heads 127 on two recording surfaces 112 of HDD 100, the read/write performance in HDD 100 can be greatly increased (in this case approximately doubled) when a single disk access command references storage blocks (or stripes) that are on recording surface 212A and recording surface 212B.

In the embodiment illustrated in FIG. 4, each of storage blocks 1-10 is depicted as a portion of a data storage track. Alternatively, in some embodiments, each of storage blocks 1-10 can include a complete data storage track or a group of multiple adjacent data storage tracks. In either case, a data storage block on recording surface 212A (e.g., data storage block 1) that corresponds to a data storage block on recording surface 212B (e.g., data storage block 2) generally has the same data storage capacity of the corresponding data storage block on recording surface 212B.

In some embodiments, the striping of recording surfaces 112 of HDD 100 is managed by microprocessor-based controller 133 and/or CPU 301, and the information associated with the striping of recording surfaces 112 may be stored in microprocessor-based controller 133, a flash memory device included in HDD 100, and/or a predetermined storage block of recording surfaces 112. The striping of recording surfaces 112 may be performed as part of the manufacturing process of HDD 100 or in response to a request from host 10. The storage block size may vary determined depending on a specific application of HDD 100 and/or on data used by host 10 or an application executed by host 10. In an embodiment, the storage block size is set to one of a sector size of storage disks 110, an integral multiple of the sector size, a particular data track size, or an integral multiple of the particular data track size.

In some embodiments, each stripe or storage block of recording surface 212A has a radial and circumferential position on recording surface 212A that substantially or exactly matches a radial and circumferential position of a corresponding stripe or storage block on recording surface 212B. For example, storage block 401 has a radial position R1 and a circumferential position C1 on recording surface 212A while corresponding stripe storage block 402 has a radial position R2 and a circumferential position C2 on recording surface 212B. In such embodiments, radial position R1 is substantially equal to radial position R2 and circumferential position C1 is substantially equal to circumferential position C2. Therefore, when read/write head 227A is disposed over storage block 401, read/write head 227B is disposed over storage block 402, and access to storages blocks 401 and 402 can be performed by HDD 100 simultaneously.

Due to the high areal storage density of data in modern HDDs, there is typically a physical offset between the radial location of a data track on one recording surface 112 of HDD 100 and the radial location of a corresponding data track on another recording surface 112 of HDD 100. Even when corresponding data tracks are initially located in identical radial positions during the servo-writing process that defines track location, changes in temperature in HDD 100 and assembly processes that occur after the servo-writing process generally cause a radial offset to be present between corresponding tracks on different recording surfaces 112 of HDD 100. In embodiments in which microactuators 129 are disposed at or near the base of flexure arms 122 (such as microactuators 228A-228F in FIG. 2), the radial range of motion provided by microactuators 129 is probably sufficient to compensate for the above-described radial offset between corresponding tracks. However, in embodiments in which microactuators 129 are disposed proximate sliders 121 (such as microactuators 229A-229F in FIG. 2), the radial range of motion provided by microactuators 129 may be on the order of a few track widths, while the radial offset between recording surfaces 112 can be on the order of tens or hundreds of tracks. In such embodiments, data striped between two recording surfaces 112 is read and written in a different order than that described above in conjunction with FIG. 4. One such embodiment is illustrated in FIGS. 5A-5E.

Figure 5A:
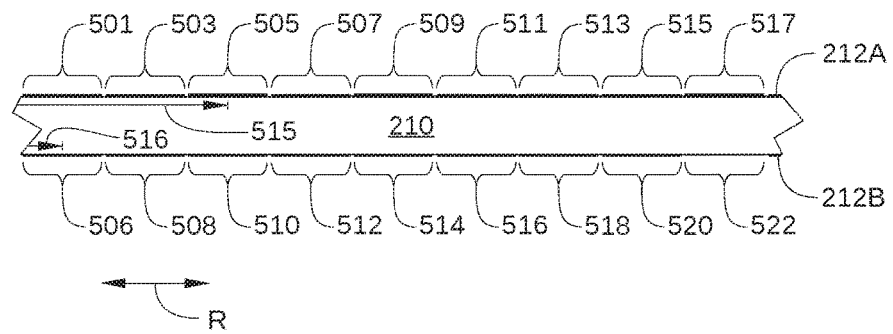
FIGS. 5A-5E schematically illustrate the process of storage blocks striped across two recording surfaces being accessed by two read/write heads, according to an embodiment.

FIGS. 5A-5E schematically illustrate the process of storage blocks striped across two recording surfaces 112 being accessed by two read/write heads 127, according to an embodiment. FIG. 5A shows storage blocks 501-522 striped between recording surfaces 212A and 212B, which are each disposed on storage disk 210. Specifically, storage blocks 501, 503, 505, 507, 509, 511, 513, 515, and 517 are disposed on recording surface 212A, and storage blocks 506, 508, 510, 512, 514, 516, 518, 520, and 522 are disposed on recording surface 212B. In the embodiment illustrated in FIGS. 5A-5E, and each of storage blocks 501-522 includes a single data track of HDD 100, but in other embodiments, each of storage blocks 501-522 can include multiple data storage tracks or fractions of data storage tracks of HDD 100. Further, because storage blocks 501-522 are associated with a single logical volume, each of storage blocks that is disposed on recording surface 212A is logically adjacent to one of the storage blocks that is disposed on recording surface 212B. For example, storage block 505 is logically adjacent to storage block 506, storage block 507 is logically adjacent to storage block 508, storage block 509 is logically adjacent to storage block 510, and so on.

In FIGS. 5A-5E, the radial direction is indicated with arrow R. As shown, a significant radial offset is present between each storage block disposed on recording surface 212A and the corresponding storage block disposed on recording surface 212B. For example, storage block 505 on recording surface 212A, which corresponds to storage block 506 on recording surface 212B has a radial location 515 that is different from the radial location 516 of storage block 506. Therefore, unless the radial stroke of microactuators 129 can position read/write head 227A and read/write head 227B to compensate for this radial offset, storage block 505 cannot be accessed simultaneously with the corresponding storage block 506. For clarity, the radial offset between each storage block disposed on recording surface 212A and the corresponding storage block disposed on recording surface 212B is depicted as an integral number of track widths. In practice, such an offset typically includes fractions of a track width as well, and generally is not an exact number of tracks in magnitude.

Figure 5B:
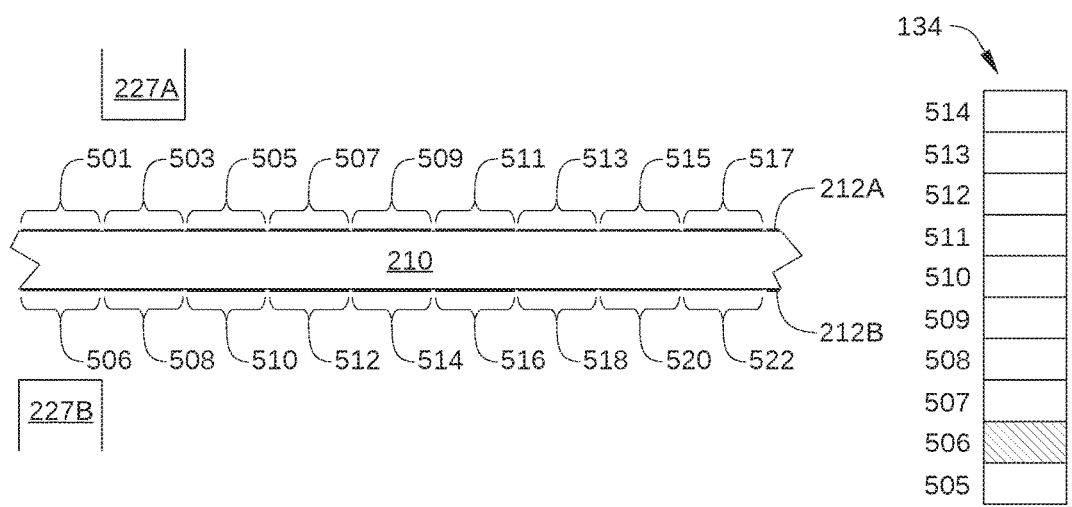

FIG. 5B shows read/write head 227A positioned over recording surfaces 212A and read/write head 227B positioned over recording surfaces 212B to begin executing a disk access command. FIG. 5B further shows a portion of RAM 134 or other buffer memory of HDD 100 configured to store data associated with the disk access command. For purposes of illustration, the disk access command is assumed to be a read command that references storage blocks 505-514, but can also be a write command. In the embodiment illustrated, read/write head 227A is offset radially from read/write head 227B by microactuator 228A (shown in FIG. 2) to partially compensate for the radial offset between the storage blocks disposed on recording surfaces 212A and the corresponding storage blocks disposed on recording surface 212B. However, when this radial offset cannot be fully compensated for by microactuator 228A, storage blocks 505-514 may not be accessed in logical order. Specifically, in the instance illustrated in FIG. 5B, read/write head 227B reads data from storage block 506 before read/write head 227A reads data from storage block 505, as indicated by the cross-hatched portion of RAM 134 that stores the data read from storage block 506. In some embodiments, read/write head 227A reads data from the current storage block over which read/write head 227A is positioned, even though a specific disk access command from a host has not requested such data. Such data are generally stored in a read cache of HDD 100.

Figure 5C:
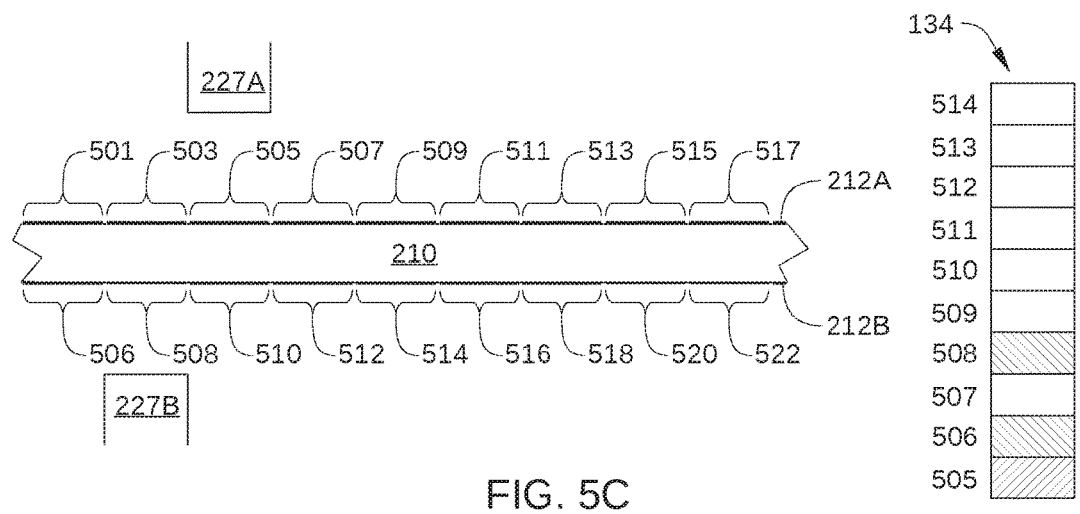

FIG. 5C shows read/write head 227A and read/write head 227B after executing an additional portion of the disk access command. Because read/write head 227A is positioned over storage block 505, read/write head 227A reads data from storage block 505 while read/write head 227B reads data from storage block 508. Thus, while read/write head 227A and read/write head 227B are positioned as shown, the read performance of HDD 100 is twice that of a conventional HDD.

Figure 5D:
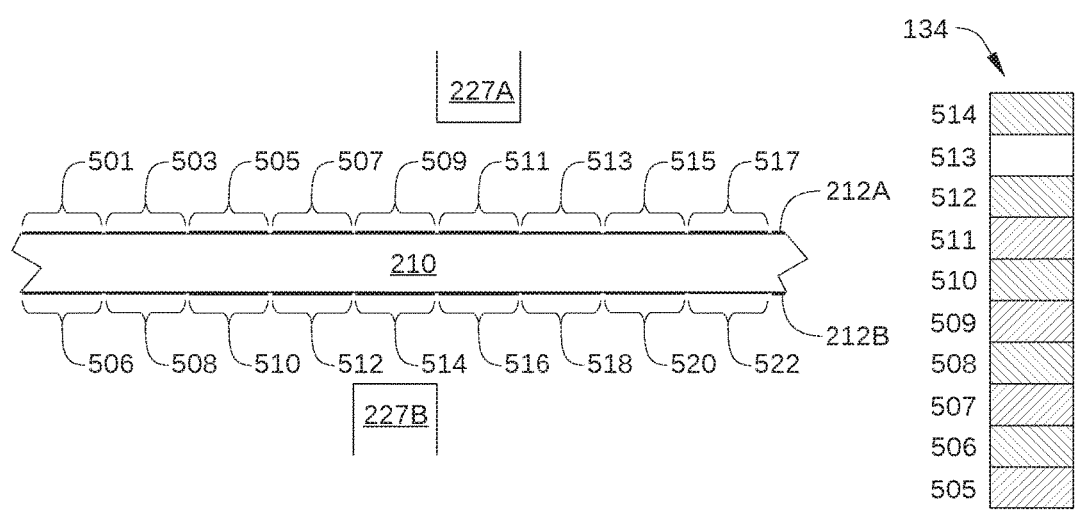

FIG. 5D shows read/write head 227A and read/write head 227B after executing an additional portion of the disk access command. Read/write head 227A and read/write head 227B continue to read simultaneously, with read/write head 227A reading storage blocks 507, 509, and 511 while read/write head 227B reads storage blocks 510, 512, and 514. Read/write head 227B reads the last portion of the data associated with the disk access command that is stored on recording surface 212B (i.e., the data stored in storage block 514).

Figure 5E:
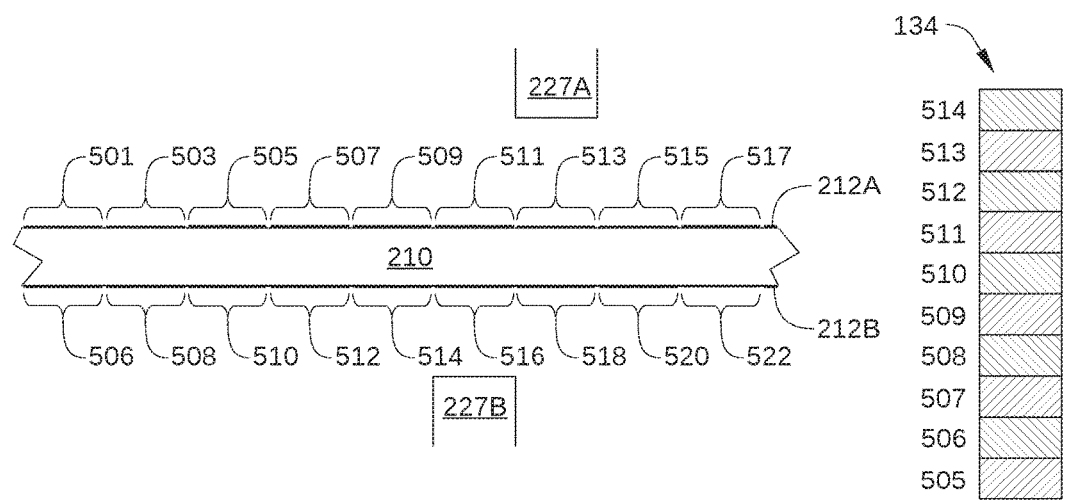

FIG. 5E shows read/write head 227A and read/write head 227B after executing a final portion of the disk access command. Read/write head 227A reads the last portion of the data associated with the disk access command that is stored on recording surface 212A, i.e., the data stored in storage block 513. In some embodiments, read/write head 227B simultaneously reads data from the current storage blocks over which read/write head 227B is positioned, even though a specific disk access command from a host has not requested such data. Such data are generally stored in a read cache of HDD 100.

Figure 6:
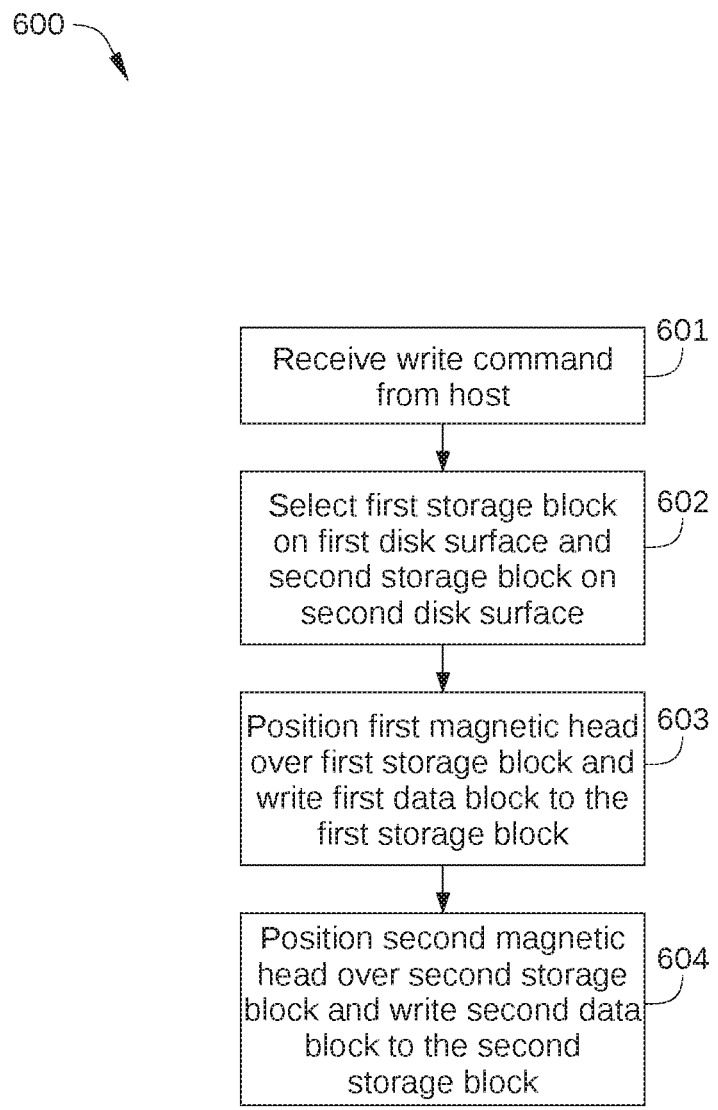
FIG. 6 sets forth a flowchart of method steps for writing data to multiple recording surfaces of the hard disk drive of FIG. 1, according to an embodiment.

FIG. 6 sets forth a flowchart of method steps for writing data to multiple recording surfaces of HDD 100, according to an embodiment. Although the method steps are described in conjunction with HDD 100 in FIGS. 1-5E, persons skilled in the art will understand that the method steps may be performed with other types of systems. In some embodiments, prior to the method steps, a logical volume associated with HDD 100 is striped between two or more of the recording surfaces 112 of HDD 100, for example during the manufacturing process.

As shown, a method 600 begins at step 601, when microprocessor-based controller 133 receives from host 10 a write command that includes a set of data 400 that has at least a first data block and a second data block. Generally, the first data block and the second data block are each sized to correspond to a single storage block of HDD 100, such as a single stripe.

In step 602, microprocessor-based controller 133 selects a first storage block disposed on a first disk surface for storing the first data block, such as storage block 1 on recording surface 212A. Microprocessor-based controller 133 further selects a second storage block disposed on a second disk surface for storing the second data block, such as storage block 2 on recording surface 212B. In some embodiments, the first storage block comprises a first data stripe that is part of a logical volume and the second storage block comprises a second data stripe that is part of the same logical volume. In such embodiments, the first data stripe can be logically adjacent to the second data stripe and physically separated from the second data stripe.

In step 603, microprocessor-based controller 133 positions a first magnetic head (e.g., read/write head 227A) over the first storage block and writes the first data block to the first storage block. A first servo system (e.g., CPU 301, read/write channel 137A or 137B, preamplifier 320A or 320B, coarse position control circuit 317, and voice-coil motor 128) performs coarse positioning of read/write head 227A and a second servo system (e.g., CPU 301, read/write channel 137A, preamplifier 320A, first fine servo controller 315, and a microactuator 129) performs fine positioning of read/write head 227A.

In step 604, microprocessor-based controller 133 positions a second magnetic head (e.g., read/write head 227B) over the second storage block and writes the second data block to the second storage block. The first servo system performs coarse positioning of read/write head 227B and a third servo system (e.g., CPU 301, read/write channel 137B, preamplifier 320B, second fine servo controller 316, and a microactuator 129) performs fine positioning of read/write head 227B.

In some embodiments, some or all of the first data block is written to the first storage block while the second data block is written to the second storage block. In some embodiments, there is a radial offset between the storage blocks disposed on the first recording surface and the corresponding storage blocks disposed on the second recording surface. In such embodiments, one or more additional data blocks included in the set of data 400 are generally written before or after the first data block and the second data block are written simultaneously.

Figure 7:
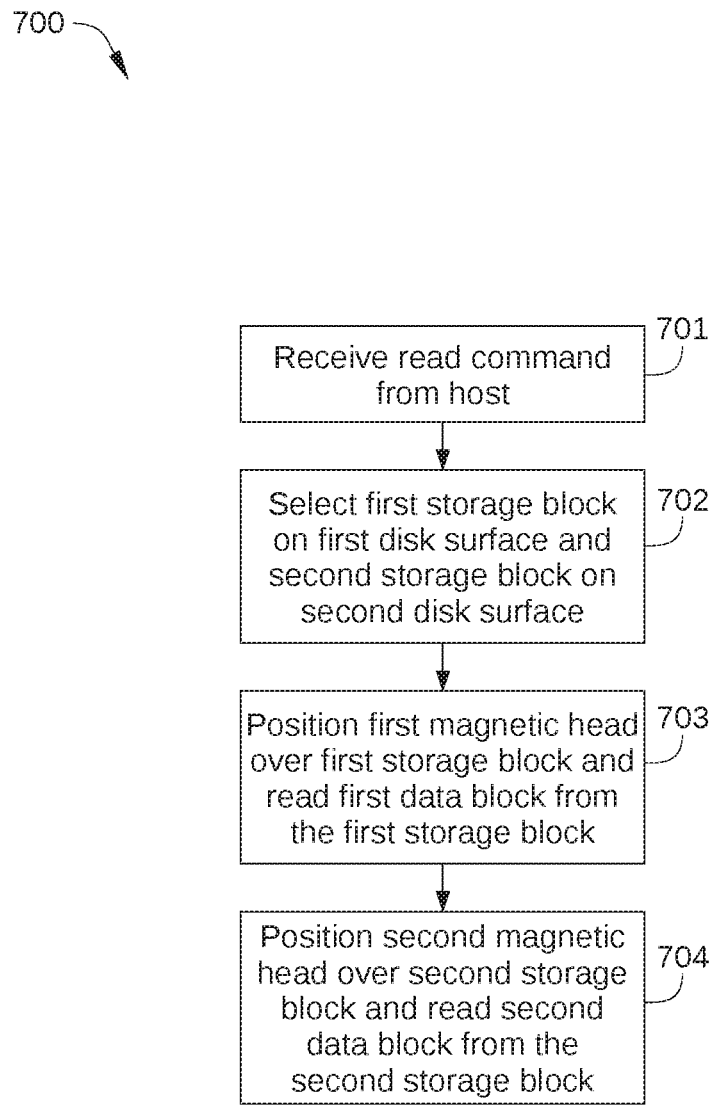
FIG. 7 sets forth a flowchart of method steps for reading data from multiple recording surfaces of the hard disk drive of FIG. 1, according to an embodiment.

FIG. 7 sets forth a flowchart of method steps for reading data from multiple recording surfaces of HDD 100, according to an embodiment. Although the method steps are described in conjunction with HDD 100 in FIGS. 1-5E, persons skilled in the art will understand that the method steps may be performed with other types of systems. In some embodiments, prior to the method steps, a logical volume associated with HDD 100 is striped between two or more of the recording surfaces 112 of HDD 100, for example during the manufacturing process.

As shown, a method 700 begins at step 701, when microprocessor-based controller 133 receives from host 10 a read command that references set of data 400 that has at least a first data block and a second data block. In some embodiments, the read command references the storage locations in HDD 100 of a set of data 400, such as a range of specific storage blocks or the equivalent thereof.

In step 702, microprocessor-based controller 133 selects a first storage block disposed on a first disk surface that currently stores the first data block, such as storage block 1 on recording surface 212A. Microprocessor-based controller 133 further selects a second storage block disposed on a second disk surface that stores the second data block, such as storage block 2 on recording surface 212B. In some embodiments, the first storage block comprises a first data stripe that is part of a logical volume and the second storage block comprises a second data stripe that is part of the same logical volume. In such embodiments, the first data stripe can be logically adjacent to the second data stripe and physically separated from the second data stripe.

In step 703, microprocessor-based controller 133 positions a first magnetic head (e.g., read/write head 227A) over the first storage block and reads the first data block from the first storage block. A first servo system (e.g., CPU 301, read/write channel 137A or 137B, preamplifier 320A or 320B, coarse position control circuit 317, and voice-coil motor 128) performs coarse positioning of a read/write head 227A and a second servo system (e.g., CPU 301, read/write channel 137A, preamplifier 320A, first fine servo controller 315, and a microactuator 129) performs fine positioning of read/write head 227A.

In step 704, microprocessor-based controller 133 positions a second magnetic head (e.g., read/write head 227B) over the second storage block and reads the second data block from the second storage block. The first servo system performs coarse positioning of read/write head 227B and a third servo system (e.g., CPU 301, read/write channel 137B, preamplifier 320B, second fine servo controller 316, and a microactuator 129) performs fine positioning of read/write head 227B.

In some embodiments, some or all of the first data block is read from the first storage block while the second data block is read from the second storage block. In some embodiments, there is a radial offset between the storage blocks disposed on the first recording surface and the corresponding storage blocks disposed on the second recording surface. In such embodiments, one or more additional data blocks included in the set of data 400 are generally read before or after the first data block and the second data block are read simultaneously.

In sum, embodiments enable increased sequential read/write performance in a drive via data striping. Specifically, a dual-stage servo system of a disk drive includes a first fine positioning servo system with a first microactuator that independently controls the position of a first read/write head over a first recording surface and a second fine positioning servo system with a second microactuator that independently controls the position of a second read/write head over a second recording surface. In operation, the first microactuator accesses (reads data from or writes data to) a first data stripe while the second fine positioning servo system simultaneously accesses a second data stripe. As a result, data can be transferred to or from the data stripes at up to twice the normal data transfer rate compared to the data transfer rate associated with accessing a single surface of the HDD with a single read/write head.

While the foregoing is directed to embodiments of the present invention, other and further embodiments of the invention may be devised without departing from the basic scope thereof, and the scope thereof is determined by the claims that follow.

I claim:

1. A disk drive comprising:
a first magnetic head and a second magnetic head;
a voice-coil motor configured for coarse positioning of the first magnetic head and the second magnetic head;
a first microactuator coupled to the voice-coil motor and the first magnetic head;
a second microactuator coupled to the voice-coil motor and the second magnetic head; and
a controller configured to:
receive from a host device a write command that includes a set of data that has a first data block and a second data block;
select a first storage block disposed on a first disk surface for storing the first data block and a second storage block disposed on a second disk surface for storing the second data block;
position the first magnetic head over the first storage block with the voice-coil motor, the first microactuator, and a first servo controller and writing the first data block to the first storage block; and
position the second magnetic head over the second storage block with the voice-coil motor, the second microactuator, and a second servo controller and writing the second data block to the second storage block.

2. The disk drive of claim 1, wherein the controller is configured to position the second magnetic head over the second storage block while writing the first data block to the first storage block.

3. The disk drive of claim 1, wherein the first storage block comprises a first data stripe that is part of a logical volume and the second storage block comprises a second data stripe that is part of the logical volume.

4. The disk drive of claim 3, wherein the second data stripe is logically adjacent to the first data stripe.

5. The disk drive of claim 1, wherein the first disk surface is disposed on a first side of a magnetic recording disk of the disk drive and the second disk surface is disposed on a second side of the magnetic recording disk.

6. The disk drive of claim 1, wherein when the first magnetic head is positioned at a first radial location that corresponds to the first storage block, the second magnetic head is positioned at a second radial location that does not correspond to the second storage block.

7. The disk drive of claim 6, wherein the set of data has a plurality of data blocks and the controller is further configured to:
select a third storage block that is for storing a third data block of the plurality of data blocks and is disposed on the first disk surface;
prior to positioning the first magnetic head over the first storage block, position the first magnetic head over the third storage block and write the third data block to the third storage block; and
while positioning the first magnetic head over the third storage block, position the second magnetic head over a fourth storage block that does not correspond to any of the plurality of data blocks.

8. The disk drive of claim 1, wherein the controller is configured to position the second magnetic head over the second storage block while writing the first data block to the first storage block.

9. A disk drive comprising:
a first magnetic head and a second magnetic head;
a first microactuator coupled to a voice-coil motor and the first magnetic head;

a second microactuator coupled to the voice-coil motor and the second magnetic head;
a voice-coil motor configured for coarse positioning of the first magnetic head and the second magnetic head; and
a controller configured to:
receive from a host device a read command that references a set of data that has a first data block and a second data block;
select a first storage block disposed on a first disk surface from which to read the first data block and a second storage block disposed on a second disk surface from which to read the second data block;
position the first magnetic head over the first storage block with the voice-coil motor, the first microactuator, and a first servo controller and read the first data block from the first storage block; and
position the second magnetic head over the second storage block with the voice-coil motor, the second microactuator, and a second servo controller and read the second data block from the second storage block.

10. The disk drive of claim 9, wherein the controller is configured to position the second magnetic head over the second storage block while the reading the first data block from the first storage block.

11. The disk drive of claim 9, wherein the first storage block comprises a first data stripe that is part of a logical volume and the second storage block comprises a second data stripe that is part of the logical volume.

12. The disk drive of claim 11, wherein the second data stripe is logically adjacent to the first data stripe.

13. The disk drive of claim 9, wherein the first disk surface is disposed on a first side of a magnetic recording disk of the disk drive and the second disk surface is disposed on a second side of the magnetic recording disk.

14. The disk drive of claim 9, wherein the controller is further configured to, when the first magnetic head is positioned at a first radial location that corresponds to the first storage block, position the second magnetic head at a second radial location that does not correspond to the second storage block.

15. The disk drive of claim 14, wherein the set of data has a plurality of data blocks and the controller is further configured to:

select a third storage block that is for storing a third data block of the plurality of data blocks and is disposed on the first disk surface;
prior to positioning the first magnetic head over the first storage block, position the first magnetic head over the third storage block and read the third data block from the third storage block; and
while positioning the first magnetic head over the third storage block, position the second magnetic head over a fourth storage block that does not correspond to any of the plurality of data blocks.

16. The disk drive of claim 14, wherein the controller is further configured to read data from the fourth storage block while reading the third data block.

17. The disk drive of claim 9, wherein the first microactuator comprises one of a first actuator disposed between and coupled to a slider and the first magnetic head, a second actuator disposed between and coupled to a flexure arm and an actuator arm associated with the first magnetic head, or a combination of the first actuator and the second actuator.

18. A disk drive comprising:
a first magnetic head and a second magnetic head;
a first microactuator coupled to a voice-coil motor and the first magnetic head;
a second microactuator coupled to the voice-coil motor and the second magnetic head;
a voice-coil motor configured for coarse positioning of the first magnetic head and the second magnetic head; and
a first recording surface that includes a first storage block and a second recording surface that includes a second storage block,
wherein the first storage block is logically adjacent to the second storage block and physically separated from the second storage block.

19. The disk drive of claim 18, wherein the first storage block comprises a first data stripe that is part of a logical volume and the second storage block comprises a second data stripe that is part of the logical volume.

20. The disk drive of claim 18, wherein the first microactuator comprises one of a first actuator disposed between and coupled to a slider and the first magnetic head, a second actuator disposed between and coupled to a flexure arm and an actuator arm associated with the first magnetic head, or a combination of the first actuator and the second actuator.

* * * * *